United States Patent [19]

Earnheart

[11] 3,912,225

[45] Oct. 14, 1975

[54] GATHERING CABLE-DISPENSING VEHICLE

[75] Inventor: Merlin E. Earnheart, Bellevue, Wash.

[73] Assignee: Truckweld Equipment Co., Seattle, Wash.

[22] Filed: Mar. 20, 1974

[21] Appl. No.: 452,760

[52] U.S. Cl. .................... 254/134.3 R; 242/86.5 R
[51] Int. Cl.² ........................................ B65H 75/40
[58] Field of Search .................. 254/134.3 R, 190; 242/86.5, 86.7, 86.8, 55.18

[56] References Cited
UNITED STATES PATENTS

| 1,735,301 | 11/1929 | Short | 254/134.3 R |
| 2,635,827 | 4/1953 | Stemm | 242/86.7 |
| 3,000,588 | 9/1961 | Brady | 242/86.5 R |
| 3,121,557 | 2/1964 | Turner | 254/134.3 R |
| 3,160,394 | 12/1964 | Hunter | 254/134.3 R |
| 3,458,152 | 7/1969 | Barkley | 242/86.7 |
| 3,614,019 | 10/1971 | Slator | 254/190 R |
| 3,780,959 | 12/1973 | Burth | 242/55.18 |

*Primary Examiner*—Al Lawrence Smith
*Assistant Examiner*—Robert C. Watson
*Attorney, Agent, or Firm*—Seed, Berry, Vernon & Baynham

[57] ABSTRACT

A vehicle is provided with multiple reel stands having reels that are individually powered for pushing cable off the reels. The cables are guided and kept segregated until they reach a gathering location in which they are nested together in a single bundle. Each of the reel stands has an independently variable-powered drive so that any variations in the speed of the cables as they leave the reels can be adjusted so that all of the cables are travelling at the same speed as they reach the gathering point. The variable-powered drive can also be used as a braking system.

3 Claims, 6 Drawing Figures

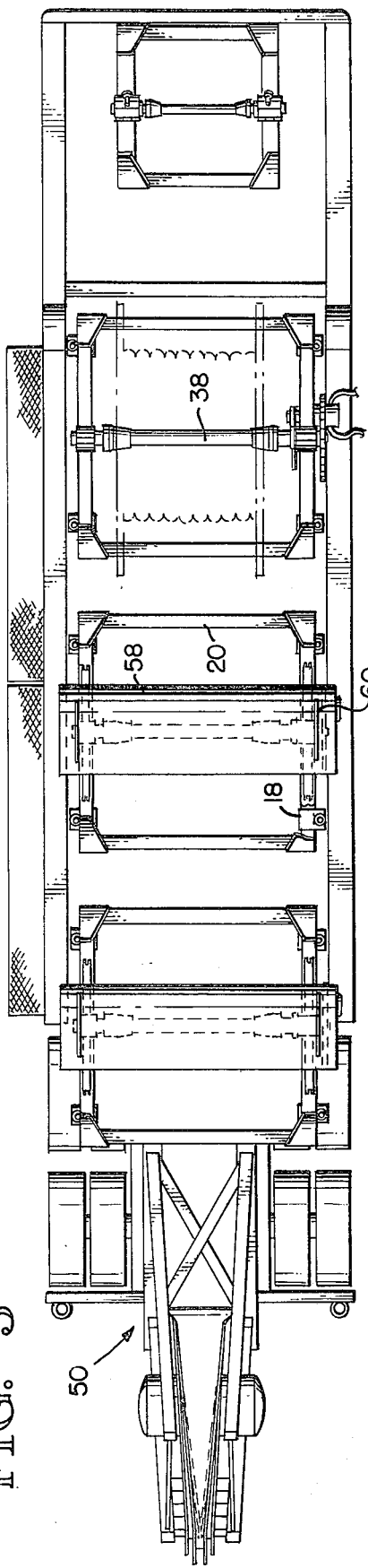
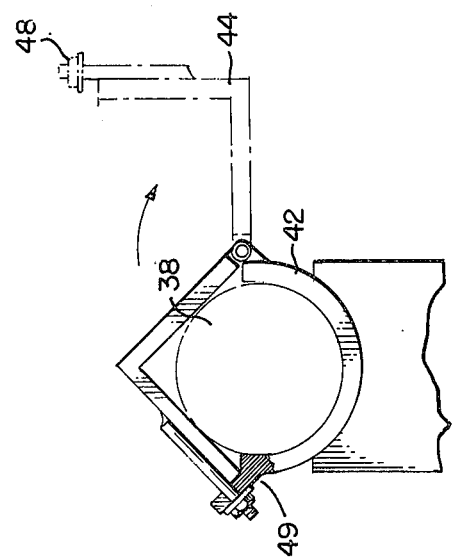
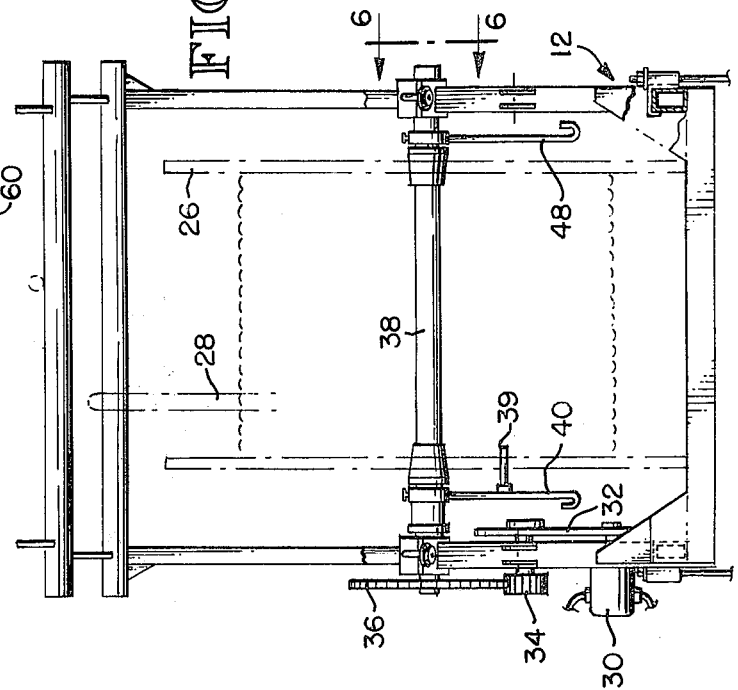
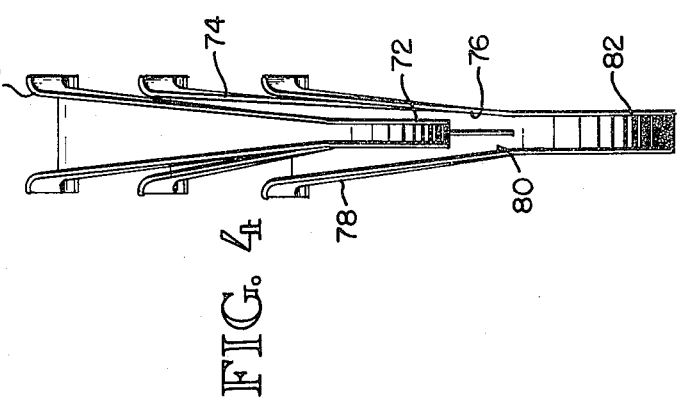

GATHERING CABLE-DISPENSING VEHICLE

BACKGROUND OF THE INVENTION

1. Field of the Invention

This invention pertains to cable laying vehicles and, more particularly, to means for dispensing from such vehicles multiple cables at substantially identical speeds and tensions.

2. Description of the Prior Art

Presently, large underground telephone and power cables, for example, ½ inch to 4 inches in diameter, are pulled from multiple reels on a vehicle by a single powered drum called a "bull wheel." Such cables are generally provided with a flexible, sensitive skin which is later pressurized for insulating and protecting the conductors within the cable. It is extremely important in handling the cable that this sensitive skin not be ruptured or otherwise damaged due to excessive abrasion or kinking.

SUMMARY OF THE INVENTION

It is an object of this invention to provide a cable-dispensing vehicle which minimizes abrasive action on the cables being dispensed.

It is another object of this invention to provide a cable-dispensing vehicle which pushes the cable to the remote location.

It is another object of this invention to provide a cable-dispensing vehicle that can push or alternately brake movement of the cable from a reel.

It is another object of this invention to provide a cable-dispensing vehicle which can deliver at a remote location multiple layers of cable, all travelling at substantially identical velocities and at the same tensions.

It is still another object of this invention to provide a cable-dispensing vehicle which is easily converted into a low-bed trailer.

These objects are best attained by providing multiple-reel stands on a vehicle with individual, variable-powered drives for rotating the reels on the reel stands. An operator at a remote location can independently adjust the speed of rotation of the individual reels so that the cables leaving the reels can all be substantially equal in speed and tension. It should be understood that cable wraps on a reel will have a velocity dependent upon the rotational velocity of the reel and the location of the outermost wrap of cable from the center of the reel. Thus two reels rotating at exactly the same rotational velocity will dispense the same lineal footage of cable for any time period only if the cable diameters are the same and only if the location of the cables is at the same radial distance from the center of the reels. Therefore, at identical rotational velocities, if one reel is almost empty, considerably less lineal footage of cable will be removed from that reel than from a reel which is full. Likewise, the lineal footage will change each time the reel starts on a new wrap on the reel.

Although not always necessary, in the preferred embodiment, the cables are gathered and brought together at a desired location, preferably a manhole entrance to an underground wiring vault, in a neat, compact bundle. The invention is particularly useful for laying underground cable since the gathering and guiding mechanisms are designed to guide the cables through a smooth arc directly into the horizontal underground duct.

In the preferred embodiment, the cable movement can also be braked to allow a controlled feed of heavy cable into deep manholes.

The cable stands and guides are all fastened by nuts and bolts so that they are quickly detachable from the trailer so that it may serve as a general utility trailer for the user.

BRIEF DESCRIPTION OF THE DRAWINGS

FIG. 3 is a plan of the vehicle shown in FIG. 2.

FIG. 4 is a rear fragmentary elevation illustrating a gathering feature of the invention.

FIG. 5 is a vertical section taken along line 5—5 of FIG. 2.

FIG. 6 is a fragmentary detail taken from the direction of the arrows 6—6 in FIG. 5.

DETAILED DESCRIPTION OF THE PREFERRED EMBODIMENTS

Figure 2:
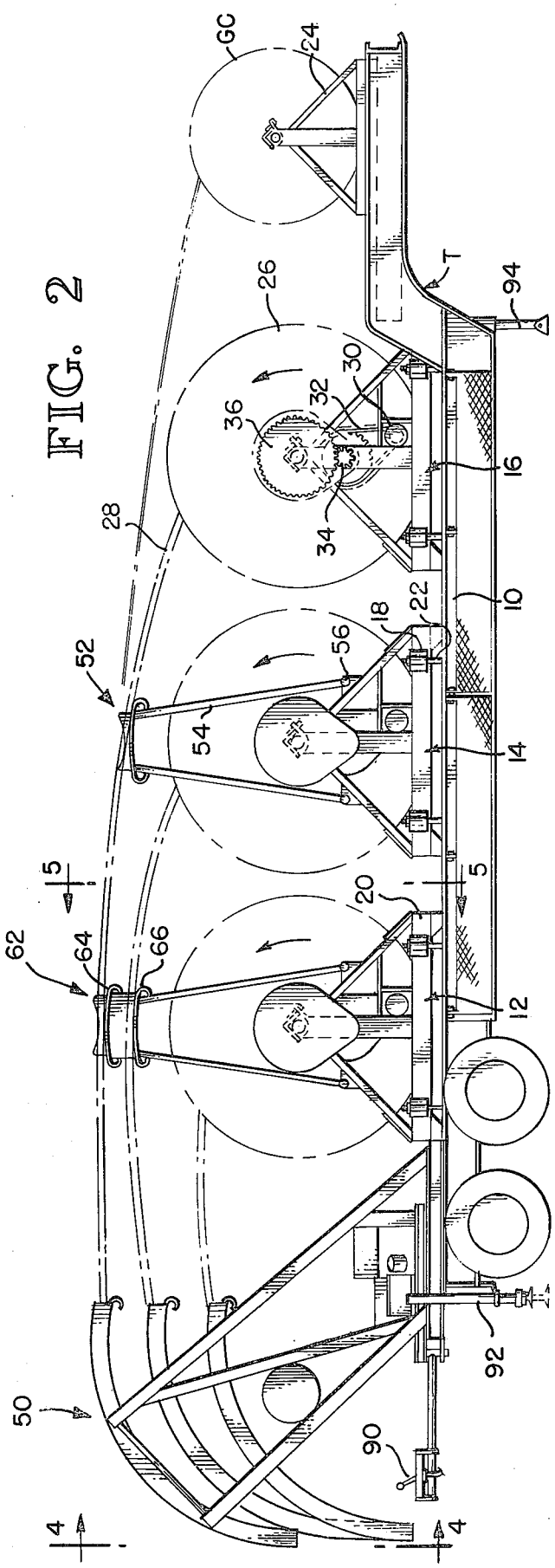
FIG. 2 is an enlarged side elevation of the vehicle shown in FIG. 1, illustrating the principles of the invention.

As best shown in FIGS. 2 and 3, a vehicle, preferably a trailer T, is provided with a bed 10 on which are mounted rear, intermediate and forward reel stands 12, 14 and 16, respectively. Preferably, the reel stands are quickly and detachably mounted by brackets 18 that fit over horizontal, rectangular frames 20 provided for each of the reel stands. Bolts 22 fasten the brackets 18 to the underside of the frame of the trailer. While a few brackets are shown for purposes of illustration, it should be understood that each of the reel stands is suitably bolted to the frame of the trailer. An additional reel stand 24 is provided for smaller diameter (for example, ¾ inch) ground cable GC, when used.

Each of the reel stands is provided with a reel 26 of conventional construction which houses multiple wraps of cable, such as 3 inch diameter cable 28. As is well understood, the reels may all be full, almost empty or somewhere in between. Each of the reels is rotated in the direction of the arrows by a hydraulic motor 30. The hydraulic motor is coupled to a chain 32 that drives a sprocket which is supported by a shaft with a pinion 34. The pinion, in turn, drives a shaft gear 36 which is secured to the reel shaft 38 of each reel. An independent motor, with a built-in 10:1 reduction, is provided for each of the reel stands shown in FIG. 2, the motors being of the type that are independently, rotationally variable. The motors are also used for drag brakes. A suitable motor is made by Hydraulic Power, Inc., of Sturtevant, Wisconsin, R2$b$ series, with a 4800 inch/pound output and a 10:1 planetary gear ratio. Other conventional types of hydraulic motors are suitable.

Each of the reels is coupled to the reel shaft 38 by a pin 39 that passes through an opening in the web or spoke of the reel, as in conventional practice. The pin is fixed to an axially adjustable hook 40 that can be moved along the axis of the reel 38 to accommodate driving engagement of various reel sizes and configurations. The reel shaft is preferably lowered, with its drive gear 36, onto shaft bearing brackets 42 mounted on the reel stands. Over-center clamps 44 can then be swung from the phantom line position, shown in FIG. 6, to the solid position, and are provided with studs 48 that fit into a yoke 49 on the bottom part of the bearing bracket 42. Thus, to raise the reel shaft or to remove it, the nuts on the stud 48 are loosened so that the top part of the bracket 44 can pivot upwardly and release the shaft 38.

A second hook 48 is also provided so that by suspending the shaft 38 from the hooks 40 and 48, the reel can be lowered into position on the reel stand.

As thus far described, cable can be individually dispensed from the vehicle to a gathering apparatus 50. In the preferred embodiment, however, and to insure minimization of abrasive action between two cables rubbing together, the cables are kept segregated through their paths to the gathering apparatus 50. For this purpose, the intermediate reel stand is provided with a cable guide 52 having a plurality of legs 54 that straddle the reel and are pinned by releasable, quickly removable pins 56 to the reel stand. The guide includes a smooth aluminum horizontal wing 58 and two upright, transversely spaced guides 60. All of the edges are rolled smooth on the members 60 and 58 so that the cable can smoothly slide over the wing. The rear reel stand 12 is provided with a double guide 62, having an upper wing 64 and a lower wing 66, basically identical to that of the guiding apparatus 52. As best shown in FIG. 2, cable from reel stand 16 passes over the uppermost wings 58 and 64, whereas cable from reel stand 14 passes over the lower most wing 66.

The gathering apparatus employs a plurality of chutes. The uppermost chute has a wide entrance 70 terminating in a funnel 72. The next lowermost chute 74 also has a wide opening terminating in a funnel 76 that is horizontally forward of the funnel 72 and to one side of a vertical center line drawn through the funnel 72. The lowermost chute 78 is provided with a funnel 80 that is forward of the funnel 72 and offset in the opposite direction of the funnel 72 from the funnel 76. Finally, the three funnels discharge in a gathering channel 82 at the bottom of the gathering apparatus. In this manner, the uppermost cable will be guided to lie in abutting relation with the two lowermost cables so that the three, when they reach the channel 82, form a compact, three-cable bundle. If desired, the ground cable GC may also be included in this bundle.

Figure 1:
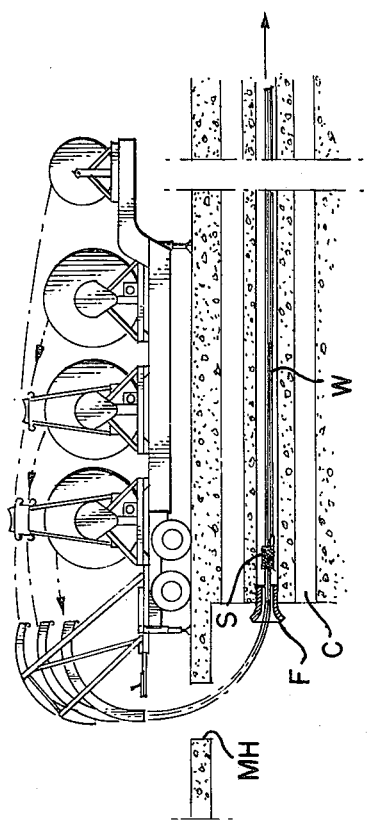
FIG. 1 illustrates the dispensing vehicle embodying the principles of the invention in position to place cables in an underground duct.

The gathering chutes are designed to provide a gentle curvature to the cables which continues in an arc down through a manhole MH into the vault of an underground duct facility. As best shown in FIG. 1, maintaining the curvature of this arc for the otherwise extremely stiff and heavy, cumbersome cable enables an operator down in the vault to easily guide the gathered cables into a duct C in the underground vault. If desired, a conventional guide funnel F, such as a flexible, metallic tubing approximately 8 inches in diameter and narrowing to a smaller diameter, is provided to guide the cable into the duct C. The customary practice is to insert the ends of the cable in a braided sock S of the type which radially contracts under tensile forces, and then pull the sock with a lead rope or wire W through the duct C. The techniques for pulling the cables through the duct are well known in the art and need no further description.

In operation, an operator stands at the rear of the vehicle at a set of conventional hydraulic controls 90 which enable him to individually power the reels forward, in reverse or to hold and brake, and to power them at any desired variable speed. Conventional metering valves provide the flow of fluid to the motors to provide the speed and braking functions. Upon reaching the site, a pair of stabilizing rams 92 are lowered to support the rear end of the trailer, along with a pair of forward rams 94. The reels are then rotated to feed the cables into the gathering apparatus 50 until the desired bundle of cables is obtained. The operator then advances the cables slowly into the manhole until they are coupled to the cable drawing sock and wire, S and W, respectively. Then, by manually controlling the controls 70, the operator varies the rotational speeds of the individual reels to maintain all of the cables at approximately the same lineal speed which corresponds to the pulling speed at the underground duct. Changes in the wrap location of an individual cable or changes otherwise in the location of a cable relative to the center of rotation of the reel is visually sensed by the operator and that reel's rotational speed compensated to again bring the cable into the same approximate lineal speed as the other cables. In this manner, all or some of the cable, including just one cable for some installations, can be fed at desired speeds easily and with less abrasive contact than heretofore known. Once the cables are fed, the excess cable can be severed and the reels reversed to wrap the free ends of the cables back onto the reels.

Heavy cable, such as 6 inch diameter cable weighing 25 pounds per foot, can initially be pushed from a reel and, if lowered into a deep hole, can then be braked by adjusting flow to the hydraulic motor to prevent the weight of a long length of cable from running uncontrolled from the reel. The invention is particularly advantageous in handling heavy cable since, by pushing the cable, the natural curve or set in the cable from being wrapped on the reel causes only light pressure on the guides 50 and 62, thus reducing wear on the surface of the cable.

While the preferred embodiments of the invention have been illustrated and described, it should be understood that variations will be apparent to one skilled in the art without departing from the principles herein.

The embodiments of an invention in which a particular property or privilege is claimed are defined as follows:

1. A cable-feeding vehicle for simultaneously dispensing multiple cables from reels travelling at different rotational speeds to a remote location at equal cable velocities, comprising:

vehicular support means, a plurality of cable reel stands on said support means, powered means for rotating said cable reels at independently variable speeds for pushing the cables off the reels at substantially equal lineal velocities and tensions, and quide means for guiding the cables from said reels to a common remote location, said guide means including segregating means for separating the individual cables until they reach said remote location to reduce abrasion damage and stationary gathering means for bringing the cables together in a compact bundle at said remote location, said stationary gathering means including a plurality of vertically separated chutes, each chute having a wide entrance for receiving a cable and a narrow discharge, said narrow discharges all terminating in a common channel at said remote location.

2. The vehicle of claim 1, said plurality of reels and chutes being at least three, said reels being horizontally spaced along the length of the vehicle as forward, middle and rear, respectively, said chutes being space vertically as lowest, middle and highest, respectively, said cable from said forward reel received by said highest chute, said cable from said middle reel received by said middle chute, and said cable from said rearward reel received by said lowest chute.

3. The vehicle of claim 1, said discharge from said highest chute having a first vertical lower portion, said discharge from said middle chute having a second vertical lower portion offset forwardly and to one side of said first vertical lower portion, said discharge of said lowest chute having a third vertical lower portion, aligned fore and aft with said second vertical lower portion and offset toward the opposite side of said first vertical lower portion whereby three cables, all in engagement with each other, can form a tight bundle.

* * * * *